US006938399B2

(12) United States Patent
Guiet

(10) Patent No.: US 6,938,399 B2
(45) Date of Patent: Sep. 6, 2005

(54) ARRANGEMENT FOR THE MOVEMENT OF A WORKING UNIT

(75) Inventor: Lionel Guiet, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/368,655

(22) Filed: Feb. 14, 2003

(65) Prior Publication Data

US 2003/0154701 A1 Aug. 21, 2003

(30) Foreign Application Priority Data

Feb. 16, 2002 (DE) ........................................ 102 06 507

(51) Int. Cl.[7] ................................................ A01D 75/30
(52) U.S. Cl. ............................................................ 56/6
(58) Field of Search ................................ 56/14.7, 14.9, 56/15.7, 15.8, 6, 7; 60/413, 469

(56) References Cited

U.S. PATENT DOCUMENTS 4,307,559 A 12/1981 Jupp et al. ................... 56/11.9
4,707,971 A * 11/1987 Forpahl et al. .................. 56/6
5,566,537 A * 10/1996 Kieffer et al. ............... 56/15.2
5,794,422 A * 8/1998 Reimers et al. .............. 56/11.9
6,098,719 A * 8/2000 Turner ........................ 172/307
6,119,802 A * 9/2000 Puett, Jr. .................... 180/242
6,349,529 B1 * 2/2002 Neuerburg et al. .......... 56/14.9

FOREIGN PATENT DOCUMENTS

EP 1 051 895 A 5/2000
EP 1 051 895 A 11/2000
FR 2 086 286 12/1971

* cited by examiner

*Primary Examiner*—M. Patel
*Assistant Examiner*—Alicia Torres

(57) ABSTRACT

The invention concerns an arrangement for the movement of a working unit of an agricultural working implement between a first position and a second position, with an actuator that is provided with a chamber to which a pressurized medium can be applied and that is coupled to the working unit in such a way that it brings the working unit into the second position when the medium is applied to the chamber and the working unit reaches the first position when the medium is not applied to the chamber. An accumulator control arrangement serves to connect the chamber of the actuator to the accumulator only when the working unit moves into the first position.

7 Claims, 3 Drawing Sheets

ARRANGEMENT FOR THE MOVEMENT OF A WORKING UNIT

FIELD OF THE INVENTION

The invention concerns an arrangement for the movement of a working unit of an agricultural working implement between a first position and a second position, with an actuator that is provided with a chamber to which a pressurized medium can be applied and that is coupled to the working unit in such a way that it brings the working unit into the second position when the medium is applied to the chamber and the working unit reaches the first position when the pressurized medium is not applied to the chamber.

BACKGROUND OF THE INVENTION

In many types of agricultural working machines, a working implement is fastened to a self-propelled carrier vehicle. The working implement that is arranged, for example, for the harvesting of plants, can be repositioned in height in many cases, in order to be able to preset the working height above the ground. Alternatively the contact force of the working implement on the ground may be variable. As a rule, working implements of this type can be moved into a non-operating position for purposes of transportation.

EP 1 051 895 A describes an agricultural working machine in the form of a mowing implement. The mowing implement is provided with several working units that are mechanically separated from each other, with mowing arrangements, that can be pivoted upward by hydraulic cylinders into their transport position. Hydraulic fluid can be applied to a controlling lifting cylinder arranged between the carrier vehicle and the working machine which is thereby brought into the transport position. In order to pivot from the transport position into the working position, the hydraulic fluid is drained from the hydraulic cylinders of the working units. An elastic accumulator is connected to the hydraulic cylinder of the working unit in order to provide the function of a shock absorbing damping element that controls the working unit that contacts the ground in the working position. During the pivoting from the working position into the transport position, the damping element is separated from the hydraulic cylinder by a shut-off valve. In order to guarantee that the shut-off valve remains in the closed position as long as the working units remain in the raised position, a pressure sensor is provided that generates a signal as a function of the pressure holding the working units in the upward position, which keeps the shut-off valve closed as long as the pressure is maintained. After undershooting a threshold value of the pressure, the shut-off valve is again opened after the lowering of the working units. Then, the working units have been folded down, and the pressure established by a safety valve in the cylinder defines the contact pressure, and the damping element absorbs any possible shock loads. Thereby, the damping element is connected to the hydraulic cylinder that pivots the working units only when the working units are in the working position.

In the known working machine it is seen as a disadvantage that a controlling lifting cylinder is required for the raising and lowering of the working units. The lowering of the working units is rather time-consuming, since the pressure in the hydraulic cylinder drains away relatively slowly as the weight of the working units is used to move the hydraulic cylinder. Finally, all three working units always move simultaneously so that the working process of the working units, that are arranged behind each other in the direction of operation, does not occur in a straight line. Thereby, difficulties can occur, for example, in the case of swaths lying perpendicular to each other.

The problem underlying the invention is seen in the need to define an improved movement system for a working implement in which the aforementioned problems have been overcome.

SUMMARY OF THE INVENTION

The invention concerns any desired agricultural working implement that is provided with at least one working unit that can be moved between a first position and a second position. As a rule, the first position is an operating position, but this is not an absolute requirement; the second position may be, in particular, a non-operating position. An actuator is provided for the movement of the working unit that contains a chamber to which a medium (for example, hydraulic fluid or air) can be applied. Pressure is applied to the chamber in order to bring the working unit into the second position. As a rule, it is returned to the first position by the force of gravity.

The invention proposes that the chamber of the actuator for controlling the position of the working unit be connected with an accumulator when the working unit is moved from the second position to the first position. Since the pressure in the accumulator can be held to a considerably lower level than the pressure in the chamber at the beginning of the movement into the first position, the coupling of the accumulator to the chamber leads to a rapid, but gentle, lowering of the pressure resulting in the working unit reaching its first position rapidly and gently.

Most appropriately, the accumulator is separated from the chamber when the working unit is brought into the second position, and remains there, so that the pressurized medium is not applied to it, which causes the actuator to bring the working unit into the position.

An obvious solution is to arrange the actuator in such a way that it also supports the working unit in the first position. The working unit is then not in contact with a mechanical stop or the like, but the pressure existing in the chamber of the actuator defines the contact pressure of the working unit on the ground. The chamber is then connected with the accumulator which absorbs any possible shock loads caused by irregularities of the ground during the operation. In order to generate a defined pressure in the chamber, a pressure relief valve can be inserted between the chamber of the actuator and a reservoir for the medium. The pressure relief valve permits the medium to drain into the reservoir as long as the pressure existing in the chamber exceeds the cut-off pressure of the pressure relief valve. The cut-off pressure of the pressure relief valve can be remotely controlled and provided as input by an operator, or an automatic control can be provided.

A control arrangement can also control various valves of the arrangement according to the invention. These various valves include: a first valve that is located between the chamber and a source of pressurized medium; a second valve that is arranged between the chamber and the pressure relief valve; and a third valve that is located between the chamber and a reservoir for the medium. The third valve may be arranged in series with the pressure relief valve; but it would also be conceivable that these be arranged in a parallel circuit in order to accelerate the drainage of the medium in the reservoir when the working unit is brought from the second position to the first position; but then a fourth valve must be arranged in series with the pressure relief valve. This fourth valve is open only in the first position. The control arrangement, that preferably operates electronically, controls the valves that are usually electromagnetic valves. In the first position, the first valve is closed, the second valve is open, and the third valve is open if it is arranged in series with the pressure relief valve; otherwise, the third valve is closed. If the working unit is to be brought into the second position, then on the basis of an input by the operator into an input arrangement, the second valve is closed, the third valve is closed, and the first valve is opened. If the working unit is to be brought back into the first position thereafter on the basis of a corresponding input, the first valve is closed, and the second and third valves are opened. Then, the medium flows out of the chamber of the actuator into the accumulator and into the reservoir for the medium. A third valve, arranged in parallel to the pressure relief valve, must then be closed again in a timely manner in order to assure that the remaining pressure of the medium is sufficient to generate the desired ground contact pressure of the working unit.

Preferably, the working implement is provided with several working units that can be moved by separately controlled actuators with which each of them is associated. Selected working units can be brought into the first position, while others remain in the second position. This may be useful at the conclusion of the operation on a field if the remaining area is too narrow to be processed with all working units or if a reduction of the working width appears appropriate due to high loads on the working units by the harvested crop. As already noted above, the individual working units are controlled, as a rule, by an input arrangement, for example, a joystick, where inappropriate types of operation of the actuators are ignored, particularly during operation over public roads.

In such an embodiment, an appropriate control of the actuators can result in working units arranged one behind the other in the forward operating direction that reach the first position (operating position) one behind the other, with a time delay as a function of the forward operating velocity, where the beginning of their operation occurs along a straight line extending transverse to the forward operating direction.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
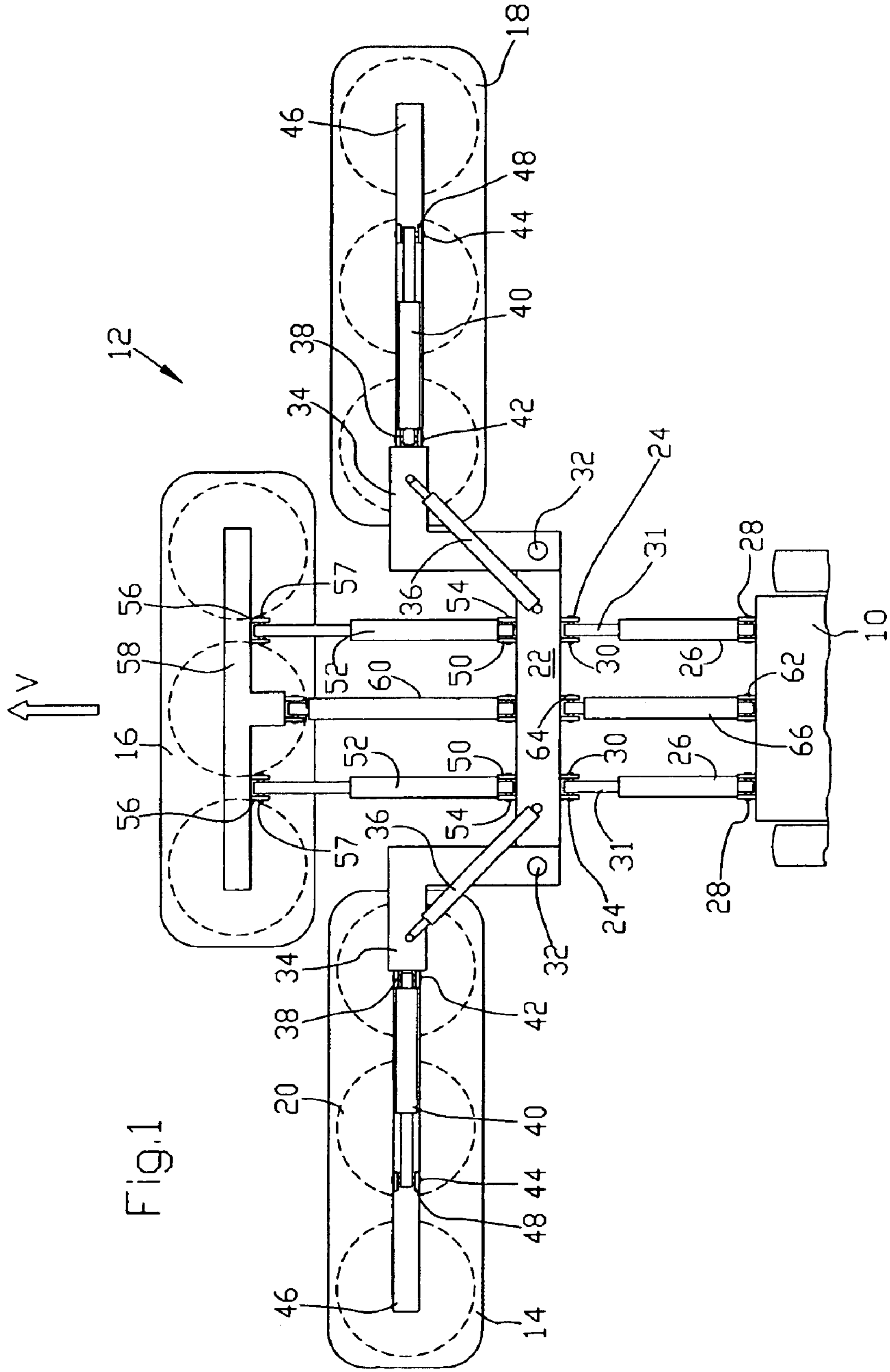
FIG. 1 is a schematic plan view of a multi-unit agricultural working implement.

Referring now to FIG. 1, there is shown a carrier vehicle 10, to the front of which is mounted an agricultural working implement 12, in a multi-unit configuration. The implement 12 includes working units 14, 16, and 18 that subdivide the total operating width of the agricultural working implement 12 into individual working widths, where the working devices of the working units 14, 16, and 18 are indicated as rotating mowing devices 20. However, the working units may be replaced by any desired agricultural working devices, such as, for example, ground breaking devices, hay harvesting devices, such as rotary swathers or rake swathers, and other crop cutting devices, for example, in the form of cutter heads or corn heads.

The agricultural working implement 12, configured as a multi-unit large area cutter head, incorporates a main frame 22 that is provided in its rear region with connecting points 24, each of which engages one end of two lifting cylinders 26 whose other ends are arranged on the carrier vehicle 10 to pivot about an axis 28 extending transverse to the direction of operation V, where the ends of the lifting cylinders 26 and the connecting points 24 also engage a pivot axis 30 that is located transverse to the direction of operation V.

The main frame 22 is provided, at both ends, with a vertical pivot axis 32 to which L-shaped side frames 34 are connected in joints, free to rotate, where the rotating motion about the axis 32 is attained by the fact that each side frame 34, in addition, is connected with the main frame 22 over one hydraulic pivoting cylinder 36. Each side frame 34 is provided with retaining flanges 38, each of which engages, free to rotate, the piston end of a single-acting lifting cylinder 40 coupled for pivoting about an axis 42 extending in the direction of operation V. At their rod ends, the lifting cylinders 40 are each also connected in a joint, free to rotate, in a retaining flange 48 about an axis 44 extending in the direction of operation V on a respective main frame 46 of the side working units 14, 18, where the working units 14, 18 are connected in a manner known in itself over at least one further joint, not shown, to the side frame 34 so that an application of pressure to the lifting cylinders 40 leads to a pivoting of the working units 14, 18 in the vertical direction.

In order to also make possible a pivoting of the working unit 16 that is arranged at the front side of the main frame 22, the main frame 22 is provided with further retaining flanges 50 that engage, free to pivot, the piston end of single acting lifting cylinders 52 used as actuators about an axis defined by pins 54 and located transverse to the direction of operation V. The rod end of the lifting cylinders 52 are engaged, free to pivot, by retaining eyes 56 that are arranged on a main frame 58 of the working unit 16 about axes 57 that are also arranged transverse to the direction of operation V. By inserting at least one coupling rod 60, that cannot be changed in length, between the working unit 16 and the main frame 22, an assurance is given that when pressure is applied to the lifting cylinders 52, the forward side working unit 16 can pivot in the vertical direction.

In order to reposition the entire agricultural working implement 12 in height in the vertical direction, opposite ends of a fixed-length coupling rod 66 are respectively pivotally coupled to retaining flanges 62 and 64, that are respectively located on the frame 22 and vehicle 10, such that pressure applied to the lifting cylinders 26 by the on-board hydraulic system of the carrier vehicle 10, that is known in itself and therefore not pictured, leads to the pivoting of the main frame 22 of the agricultural working implement 12 in the vertical direction.

The mechanism shown in FIG. 1 is only one example of a working implement with a working unit that can be moved between an operating position and a non-operating position.

Other implements of this type to which the invention can also be applied are disclosed, for example, in each of DE 43 22 263 A and DE 101 21 014 A, whose disclosures are incorporated by reference in the present application.

Figure 2:
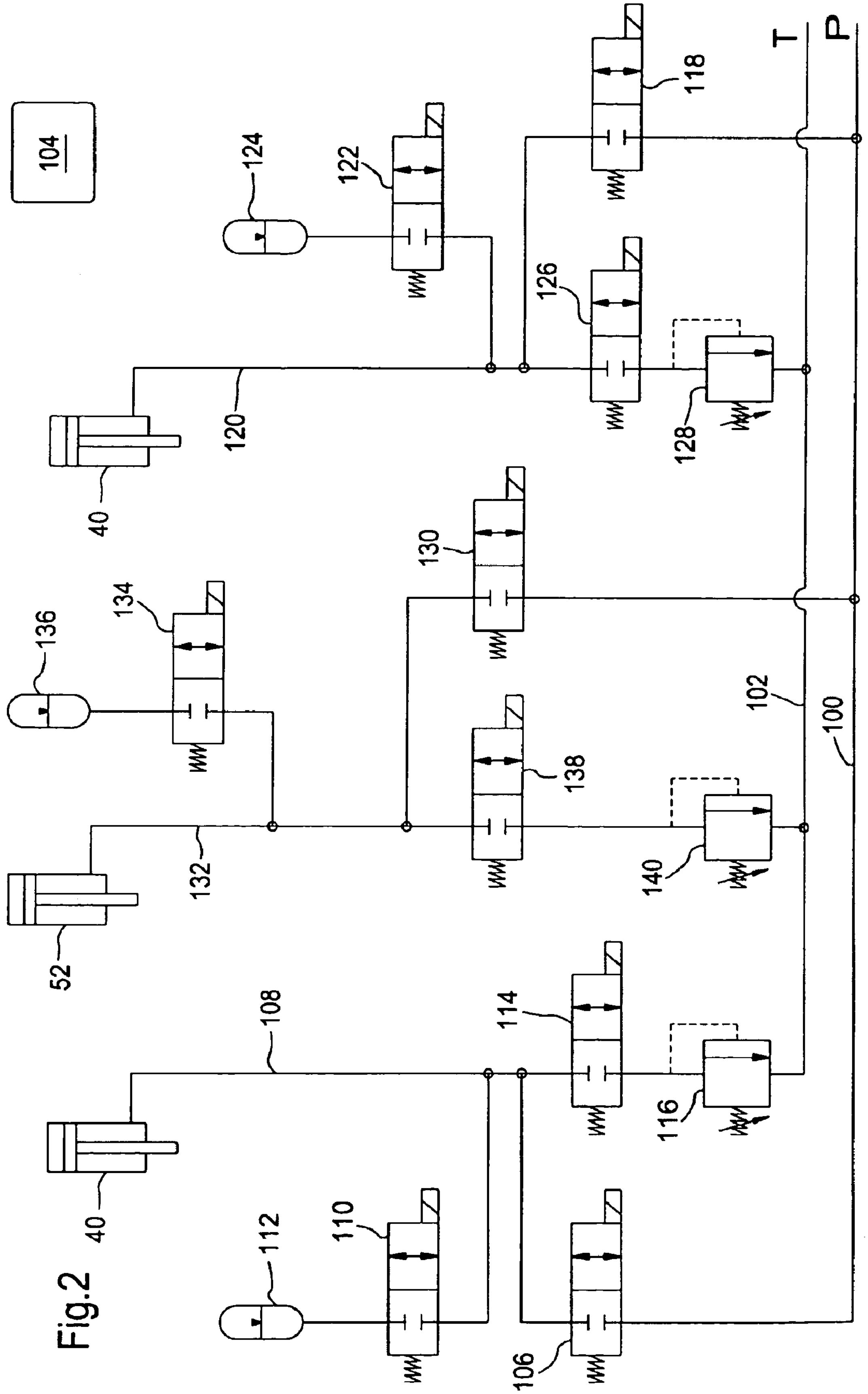
FIG. 2 is a hydraulic circuit diagram of the arrangements for the movement of the working units of the working implement.

FIG. 2 shows a hydraulic circuit diagram of the elements used for the movement of the working units 14, 16, and 18 between operating and non-operating positions. A first line 100 is connected over a plug-in connection, not shown, with a source P of pressurized hydraulic fluid that is located on the carrier vehicle 10. The hydraulic fluid is used as medium that applies pressure to the actuators. A second line 102 is connected over a plug-in connection, not shown, with a reservoir T for non-pressurized hydraulic fluid that is also located on the carrier vehicle 10. An electromagnetically controlled (first) shut-off valve 106 is connected on its inlet side with the line 100 and on its outlet side with a line 108, which is connected with the rod end chamber of the hydraulic cylinder 40 of the left working unit 14. Furthermore, the line 108 is connected with an accumulator control device defined by an electromagnetic (second) shut-off valve 110, whose other end is connected with an elastic (pneumatic) accumulator 112. Furthermore, the line 108 is connected with a further, electromagnetically controlled (third) shut-off valve 114, whose outlet side is connected over a pressure relief valve 116 with the line 102.

For the right working unit 18, an electromagnetically controlled shut-off valve 118 is connected on its inlet side with the line 100 and on its outlet side with a line 120, which is connected with the rod end chamber of the hydraulic cylinder 40 of the right working unit 18. Furthermore, the line 120 is connected with an accumulator control device defined by an electromagnetic shut-off valve 122, whose other end is connected with an elastic (pneumatic) accumulator 124. Furthermore the line 120 is connected with a further electromagnetically controlled shut-off valve 126, whose output side is connected over a pressure relief valve 128 with the line 102.

For the center working unit 16, an electromagnetically controlled shut-off valve 130 is connected at its inlet side with the line 100 and on its outlet side with a line 132, which is connected with the rod end chambers of the hydraulic cylinders 52 of the center working unit 16. Furthermore, the line 132 is connected with an accumulator control device defined by an electromagnetic shut-off valve 134, whose other end is connected with an elastic (pneumatic) accumulator 136. Furthermore, the line 132 is connected with a further, electromagnetically controlled shut-off valve 138, whose outlet side is connected over a pressure relief valve 140 with the line 102.

The shut-off valves 106, 110, 114, 118, 122, 126, 130, 134, and 138 are controlled by a control arrangement 104, shown schematically. The pressure relief valves 116, 128 and 140 can be repositioned by the control arrangement, so that their shut-off pressure can be varied by remote control. The control arrangement can be located on the carrier vehicle 10 or on the working implement 12.

The hydraulic cylinders 40 and 52 make it possible to lift the working units 14, 16, 18 about horizontal pivot axes and to bring them out of the operating position shown in FIG. 1 into a non-operating position by applying pressure to the rod end chambers of each of the cylinders 40 and 52 by actuating the normally closed valves 106, 118 and 130 to their respective open positions connecting the pressure fluid line 100 to the cylinders 40 and 52. Once the units 14, 16 and 18 are in their raised position, the valves 106,118 and 130 are deactivated so as to return to their respective normally closed positions so as to lock the units 14, 16 and 18 in their non-operating positions. To return the units 14,16 and 18 to their operating positions, the valves 114, 126 and 128 are opened so as to permit the units 14, 16 and 18 to gravitate to their respective operating positions, as described below in further detail. In the operating position of the units 14, 16 and 18, pressure is respectively applied to the rod end chambers of the hydraulic cylinders 40 and 52 by the accumulators 112, 124 and 136, but not when being raised to, or located in the non-operating position, as is explained below. The working units 14, 16 and 18 are suspended mechanically from the main frame 22 in such a way that the pressure then existing in the hydraulic cylinders 40 and 52 due to the pressure contained in the accumulators 112, 124, and 136 defines the contact pressure of the working units 14, 16, 18 on the ground.

Figure 3:
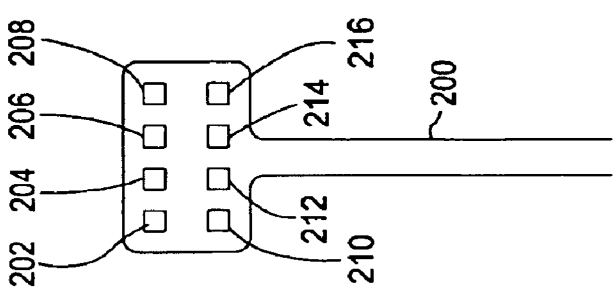
FIG. 3 is a schematic representation of an operating lever of the carrier vehicle.

FIG. 3 shows a view of the operating lever 200 of the carrier vehicle 10. It is located in the operator's cab and can be pivoted as a whole for the input of the operating velocity about an axis extending transverse to the direction of operation V. At its upper end, two rows of keys are arranged one above the other, the keys are 202, 204, 206, 208 or 210, 212, 214, and 216. The keys are connected with the control arrangement 104. The upper, left key 202 is used to lift all working units 14, 16, 18 into the non-operating position, while the keys arranged to the side alongside these permit the lifting of the individual working units separately. Analogously the keys 210–216 arranged in the lower row are used to lower all or individual working units 14, 16, 18 into the operating position. Further input means, not shown, (buttons or keys) are provided for the input of the contact pressure of the working units 14–18. The control arrangement 104 adjusts the shut-off pressure of the pressure relief valves 116, 128, and 140 corresponding to the input or controls it with the use of an appropriate sensor.

Figure 4:
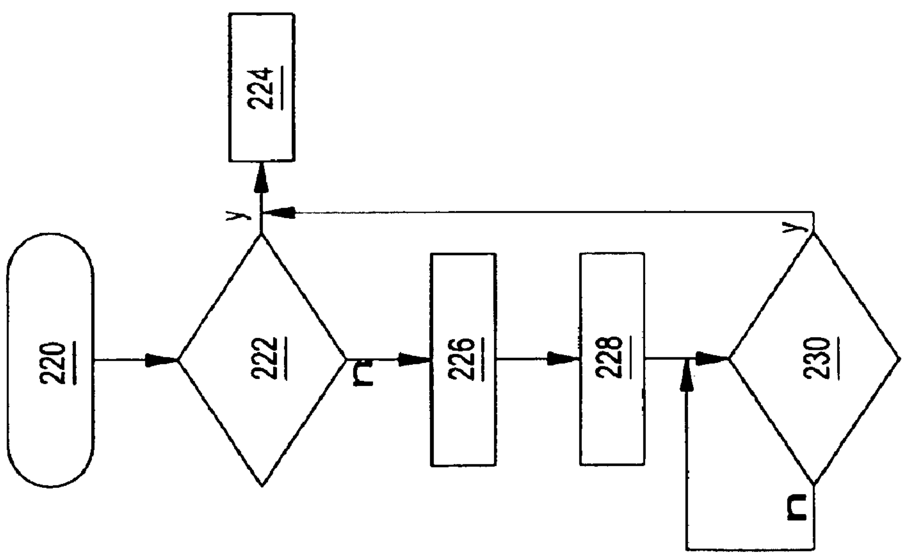
FIG. 4 shows a flow chart that illustrates the sequence of the control during the lifting of the working units.

FIG. 4 shows a flow chart of the control steps brought about by the control arrangement 104 after the key 202 has been pressed. After the start in step 220, in step 222, the question is initially posed whether the working units 14, 16, 18 are already in the non-operating position, which can be checked on the basis of the signal of appropriate sensors. If this is the case, step 224 follows in which the process is ended. If it is not the case, step 226 follows in which the shut-off valves 110, 114, 122, 126, 134, and 138 are closed. In the following step 228, the valves 106, 118, and 130 are opened. Then, step 230 follows in which the question is posed whether the working units 14, 16, and 18 are in the non-operating position. If the answer is no, step 230 again follows, otherwise step 224. During the lifting, the accumulators 112, 124, and 136 are thereby separated from the hydraulic cylinders 40 and 52, in order to avoid loading the accumulators with pressure unnecessarily and in order to lift the working units 14–18 rapidly. Pressure is applied to the cylinders 40 and 52 from the line 100 and pivot the working units 14, 16, and 18 upward in the above-described manner.

Figure 5:
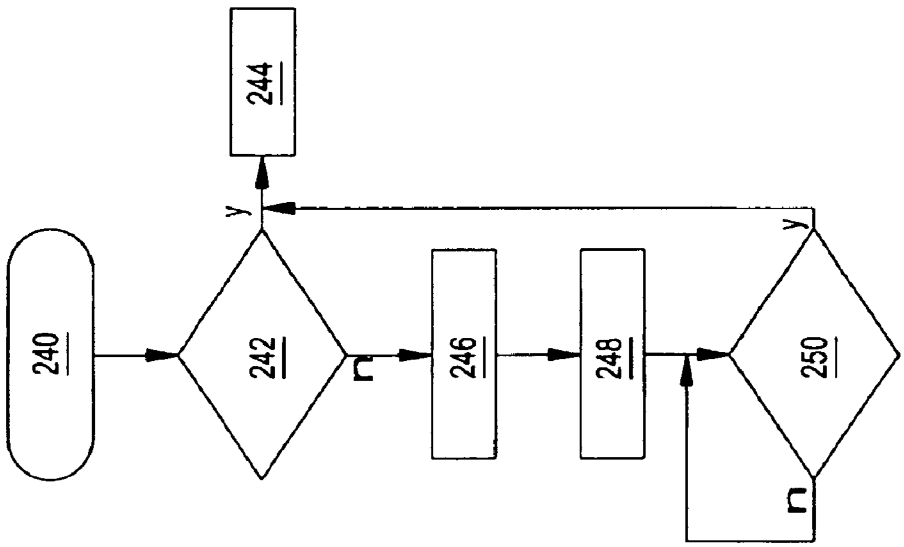
FIG. 5 shows a flow chart that illustrates the operation of the control during the lowering of the working units.

FIG. 5 shows a flow chart according to which the control arrangement 104 proceeds when the key 210 is pressed. After the start in step 240, the question is initially posed whether the working units 14, 16 and 18 are already in the operating position. If that is the case, step 244 follows, in which the routine ends. Otherwise step 246 follows in which the shut-off valves 106, 118 and 130 are closed. In the following step 248, the shut-off valves 114, 126, and 138 are opened, which leads to the hydraulic fluid flowing through the pressure relief valves 116,128, and 140 into the line 102 and into the reservoir. Simultaneously, (or shortly before or after), in step 248 the shut-off valves 110, 122, and 134 are opened. Thereby, hydraulic fluid also flows out of the cylinders 40 and 52 into the accumulators 112, 124, and 136. The pressure in the cylinders 40 and 52 drops off relatively rapidly so that the working units 14, 16, and 18 are lowered rapidly and gently under the force of gravity. Step 250 follows in which the question is posed whether the working units 14, 16 and 18 are already in the operating position. If that is not the case, step 250 again follows, otherwise step 244.

The pressure in the hydraulic cylinders 40 and 52, and thereby the ground contact pressure of the working units 14, 16, and 18, is defined in the operating position by the pressure relief valves 116, 128, and 140, whose shut-off pressure can be controlled by the control arrangement 104. The working units 14, 16, and 18 make contact with the ground in the working position and transmit shock loads to the working implement 10 in case they encounter uneven ground. The result is that the pistons of the hydraulic cylinders 40 and 52 assume different positions. The elastic accumulators 112, 124, and 136 take in or discharge hydraulic fluid as a function of the position of the pistons. Thereby the accumulators take over the function of a shock absorbing damping element, so that the mechanical damping elements provided in known working implements, such as compression springs, can be omitted.

If one of the keys 204–208 or 212–216 is activated, only the valves associated with the selected working units are activated by the control arrangement 104, so that only this working unit is moved.

Figure 6:
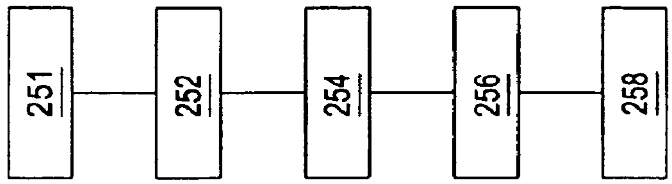
FIG. 6 shows a flow chart that illustrates the operation of the control at the beginning of the mowing process.

In some cases, it may be useful to begin a mowing process at a straight line that extends transverse to the direction of operation V. After actuating a further key, not shown in FIG. 3, on the operating lever 200, the process shown schematically in FIG. 6 is initiated. After the start in step 251, in step 252, the center working unit 16 is lowered first, in that the procedure shown in FIG. 5 is performed only for the hydraulic elements associated with the center working unit. In the following step 254, the time interval is then calculated in the direction of operation until the side working units 14 and 18 arrive at the point at which the center working unit 16 has begun its operation, on the basis of the operating velocity of the carrier vehicle 10 as measured with a sensor and the offset of the working units 14 and 18, on the one hand, and the working unit 16, on the other hand, in the direction of operation. In step 256, the outer working units 14 and 18 are lowered at the time calculated in step 254. Here again, a procedure is performed as was disclosed in FIG. 5. Finally the process ends in step 258. An analogous procedure can be provided for the lifting of the working units 14–18 on a straight line. These proposals are independent features.

Having described the preferred embodiment, it will become apparent that various modifications can be made without departing from the scope of the invention as defined in the accompanying claims.

What is claimed is:

1. In an agricultural working implement including at least one working unit mounted thereon for movement between operating and non-operating positions, a single-acting, extensible and retractable actuator coupled to said working unit and including a chamber, a medium under pressure and a medium reservoir connected to said chamber by way of a first control arrangement operable for selectively coupling said chamber either to said medium under pressure or medium reservoir, and said actuator being coupled with said working unit in such a way that it brings the working unit into said non-operation position when the medium is applied to the chamber, and permits said working unit to gravitate to said operating position when the chamber is coupled to said reservoir, the improvement comprising: an accumulator; an accumulator control device coupled between said accumulator and said chamber for connecting said accumulator to said chamber both when said working unit is in, or moving toward, said operating position and for preventing said medium under pressure from flowing to said accumulator when said chamber is connected to said medium under pressure; said operating position is a position wherein said working unit is in ground contact; a relief valve being located between said chamber and said reservoir for establishing a maximum pressure in said chamber when said chamber is coupled to said accumulator; and said actuator being arranged such that a pressure existing in said chamber when said working unit is in said operating position defines a contact pressure on the ground of the working unit.

2. The agricultural working implement, as defined in claim 1, wherein said relief valve is a remotely controlled pressure relief valve coupled between said first control arrangement and said reservoir for the medium, such that when said first control arrangement is operated to connect said chamber to said reservoir this connection is made by way of said pressure relief valve.

3. The agricultural working implement, as defined in claim 1, wherein said first control arrangement includes first and second control valves for respectively selectively coupling said chamber to said medium under pressure or to said medium reservoir; and wherein said accumulator control device is a third valve located between said chamber and said reservoir for the medium.

4. The agricultural working implement, as defined in claim 3, wherein said third valve is arranged in a series circuit with said pressure relief valve.

5. In an agricultural working implement including at least first and second working units mounted thereon for movement between respective first and second positions, first and second extensible and retractable actuators respectively coupled to said first and second working units and respectively including first and second chambers, a medium under pressure, a medium reservoir, first and second control arrangements being respectively coupled to said first and second chambers for selectively connecting them either to said medium under pressure or medium reservoir, and said first and second extensible and retractable actuators being respectively coupled with said first and second working units in such a way that they bring the working units into said respective second positions when medium under pressure is connected to said first and second chambers, and permits said first and second working units to move to said respective first positions when the first and second chambers are coupled to said reservoir, the improvement comprising: first and second accumulators; first and second accumulator control devices respectively coupled between said first and second accumulators and said first and second chambers for respectively connecting said first and second accumulators to said first and second chambers only when said first and second control arrangements are operated for selectively coupling said first and second chambers to said medium reservoir; and said first and second control arrangements respectively including first and second pressure-relief valves respectively coupled between said first and second chambers and said medium reservoir so that said first and second accumulators are charged only by fluid respectively flowing from said first and second chambers, with said first and second pressure relief valves respectively establishing a charge pressure of said first and second accumulators.

6. The agricultural working implement, as defined in claim 5, wherein said second working unit is located to the rear and transversely of, said first working unit; and said first and second control arrangements operating in sequence, such that the points at which the work of said first and second units begins, lies on a straight, transverse line during forward movement of the working implement.

7. The agricultural working implement, as defined in claim 6, wherein said working units are mowers.

* * * * *